Aug. 29, 1967   W. KITTEL   3,338,566
GAS-LIQUID CONTACT COLUMN APPARATUS
Filed Dec. 24, 1963   8 Sheets-Sheet 2
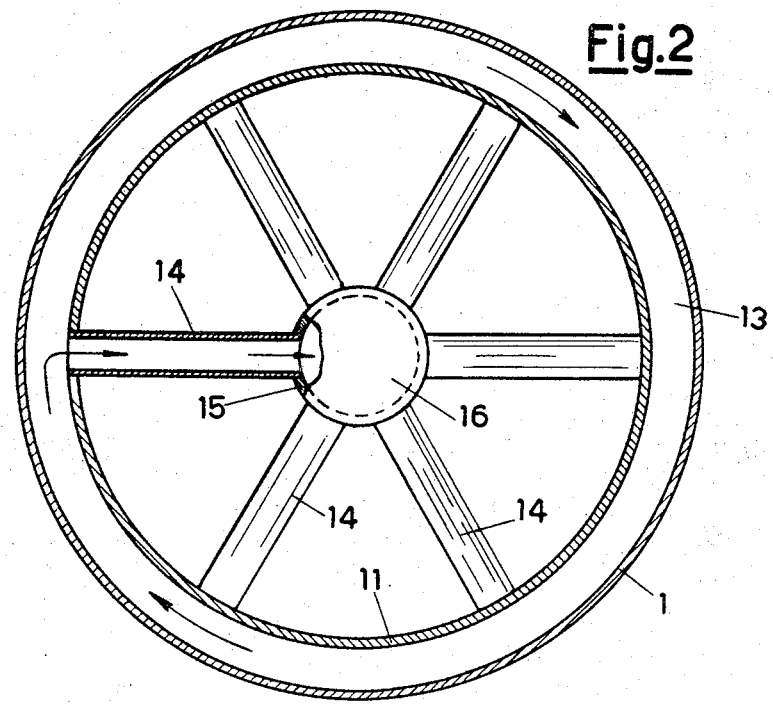
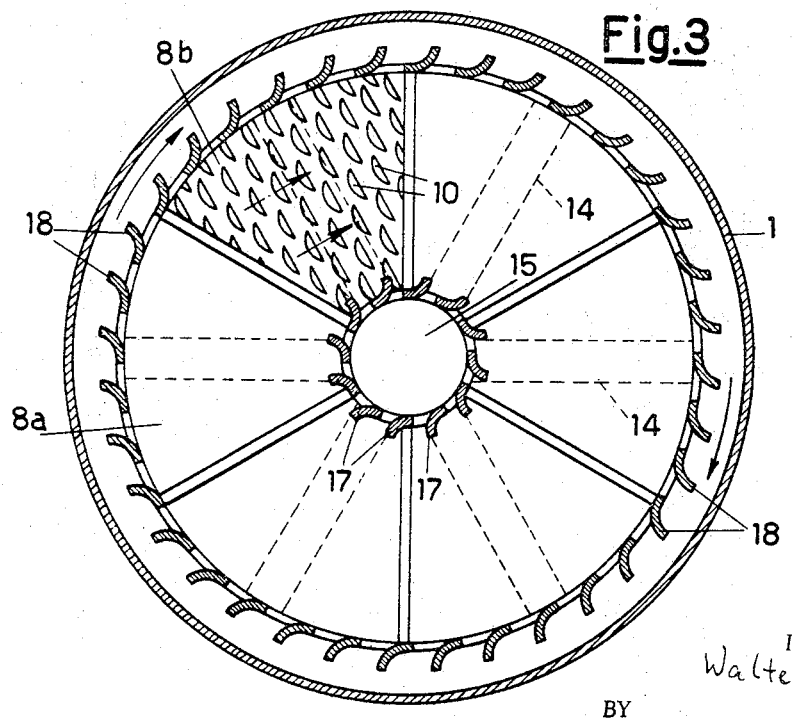
INVENTOR.
Walter Kittel
BY Nolte & Nolte
Attorneys Aug. 29, 1967 W. KITTEL 3,338,566
GAS-LIQUID CONTACT COLUMN APPARATUS
Filed Dec. 24, 1963 8 Sheets-Sheet 3
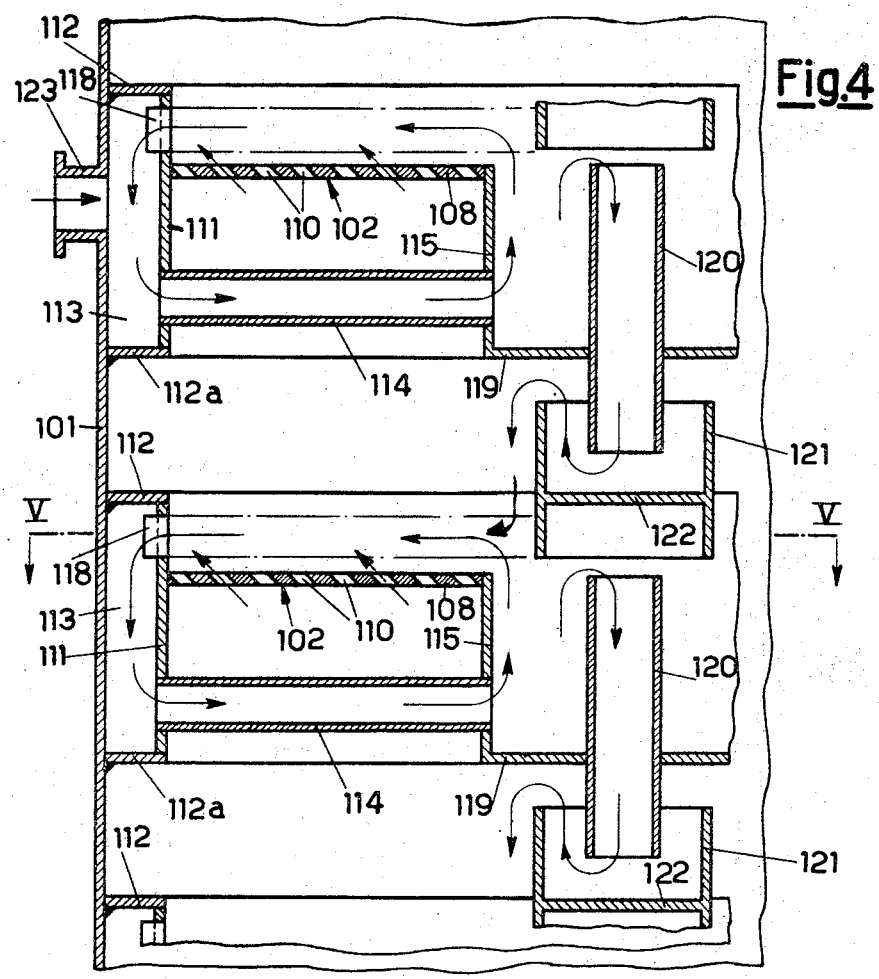
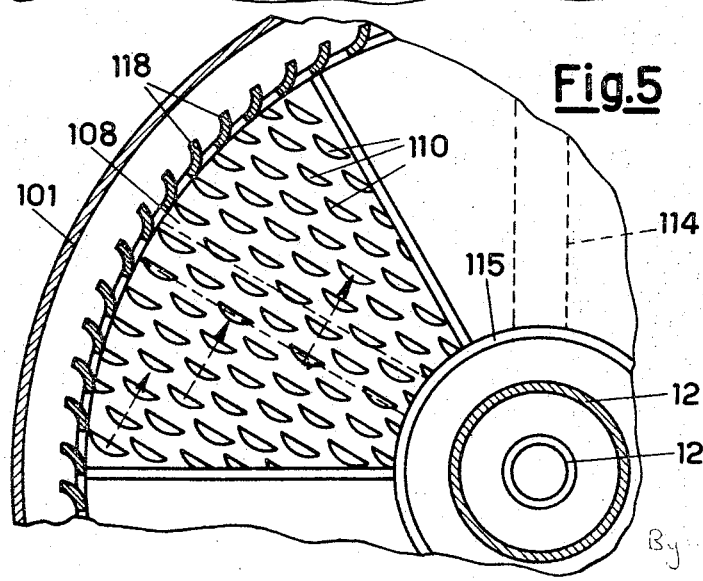
INVENTOR.
Walter Kittel
By Nolte e Nolte
Attorneys

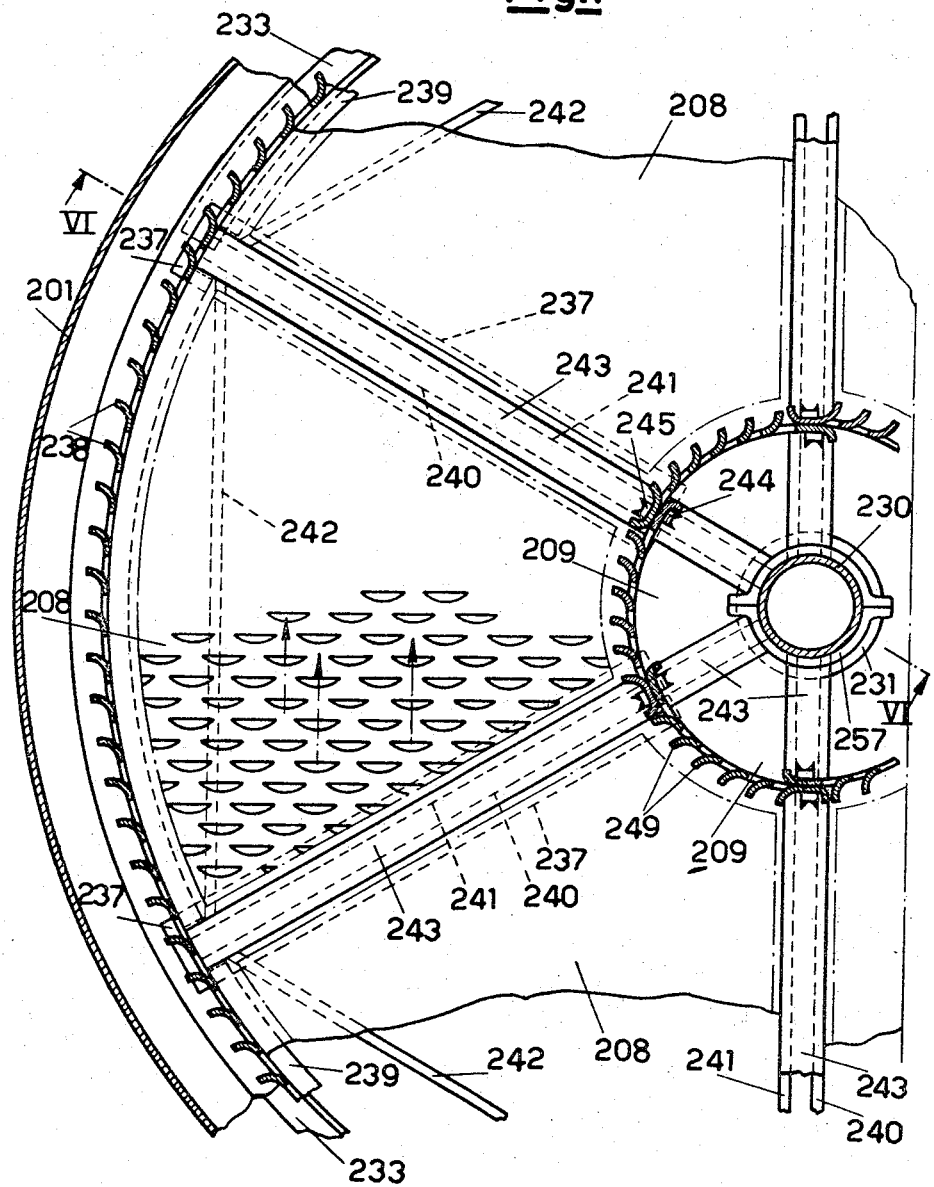

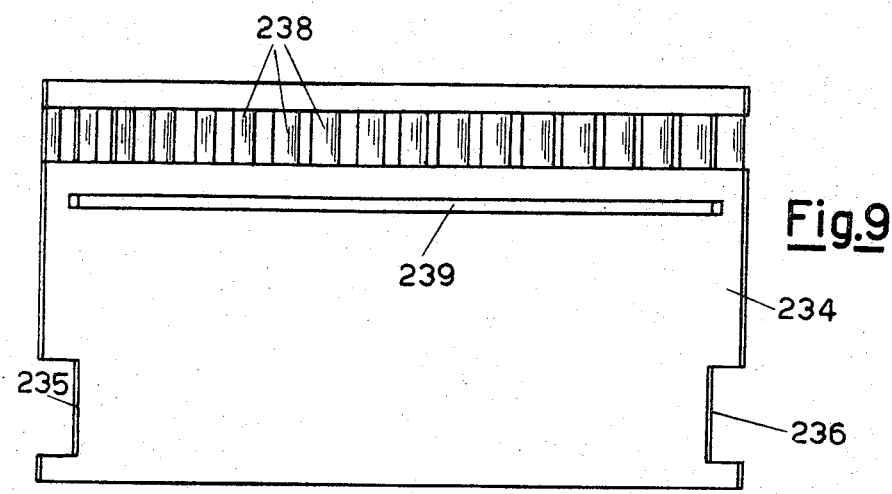
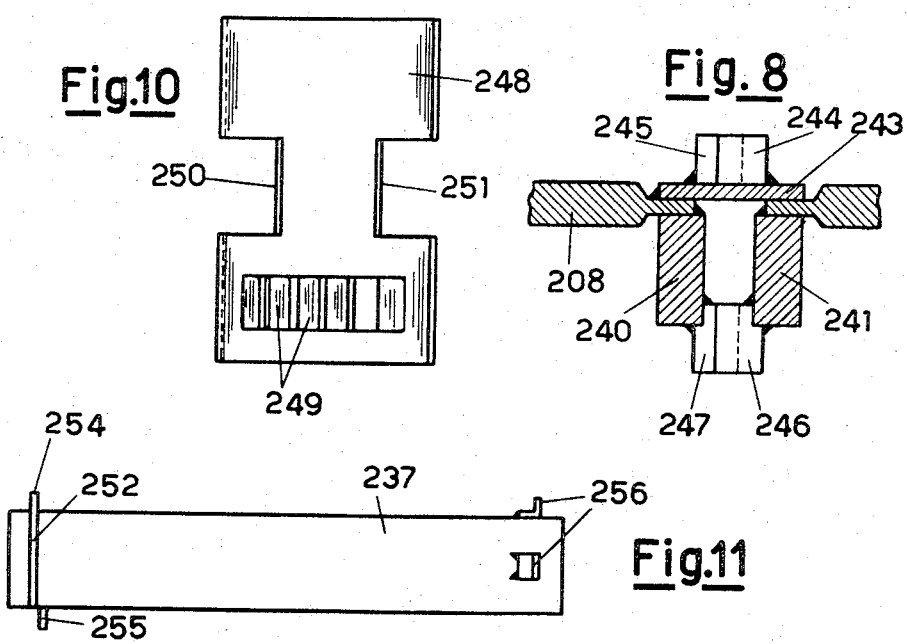

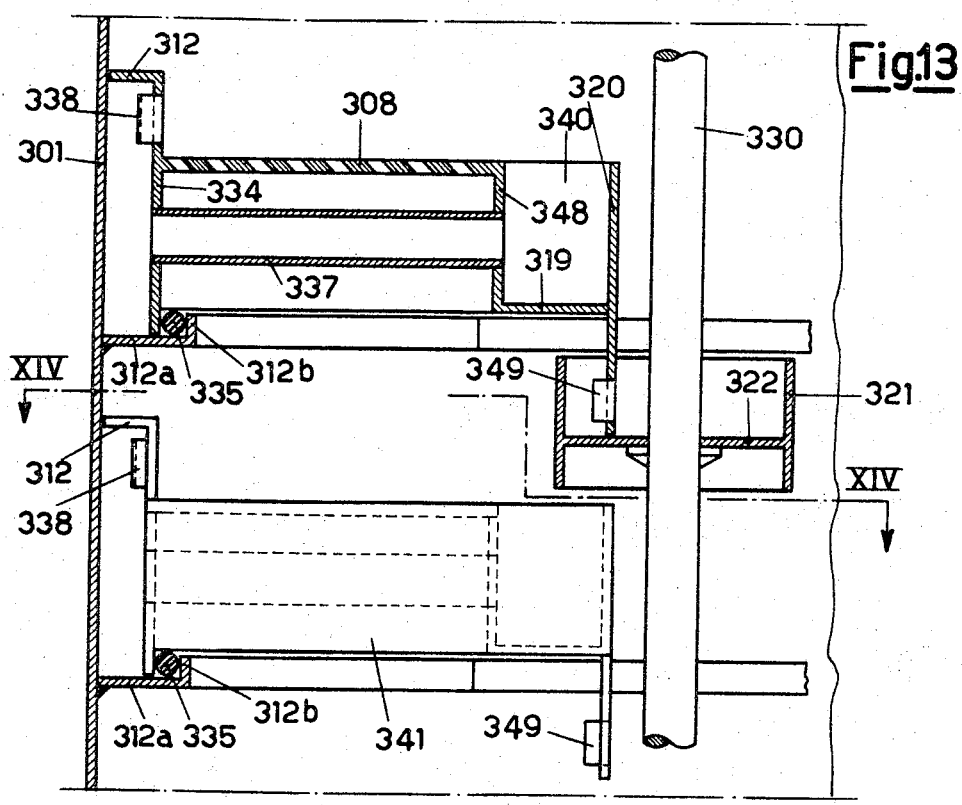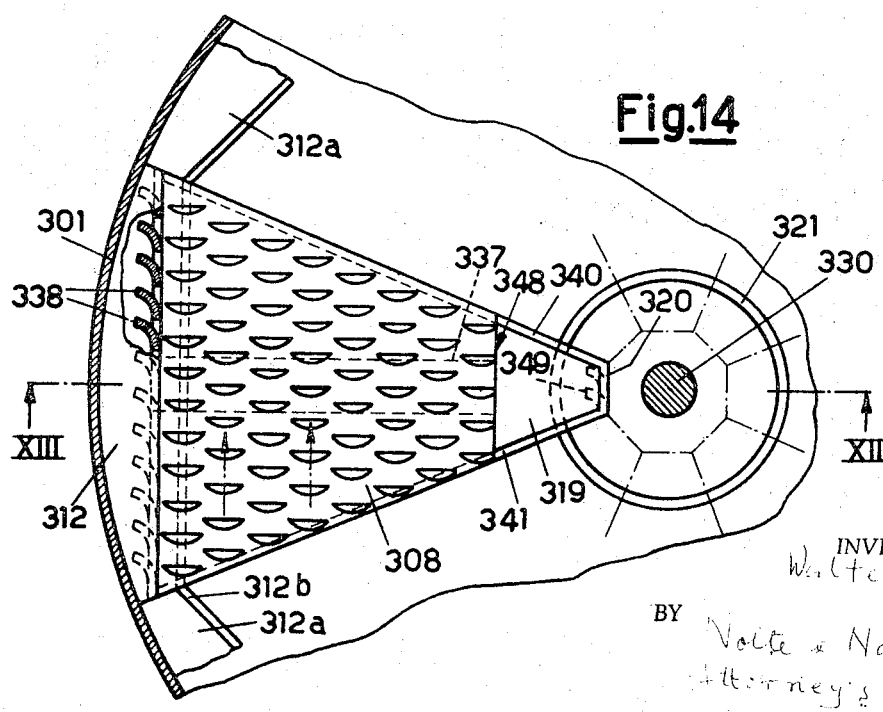

3,338,566
GAS-LIQUID CONTACT COLUMN APPARATUS
Walter Kittel, Gmunden, Austria, assignor to Counter Current Operations G.m.b.H., Arosa, Switzerland, a company of the Swiss Confederation
Filed Dec. 24, 1963, Ser. No. 333,221
Claims priority, application Switzerland, Dec. 29, 1962, 15,284/62
5 Claims. (Cl. 261—113)

This invention relates to contact columns wherein a plurality of apertured exchange plates are arranged to cause intimate contact between a descending liquid and ascending gases or vapors.

The advantages of introducing the ascending gases or vapors into the liquid layer on the plates within the column apparatus in such a manner that the liquid is caused to flow in a determinate direction on the plates are generally known. Such an introduction is particularly advantageous if the gas-discharge apertures are arranged on circular or polygonal paths concentrically disposed around the center axis of the plates, and aligned in a uniform direction of flow tangentially to such paths. Under such circumstances, liquid fed into the median area of a plate will be set into rotation by the gases or vapors flowing from the discharge apertures, which will result in a considerable increase in the desired surface renewal between the gases or fumes and the liquid, while preventing the deposit of solid substances on the plate surface due to the intensive liquid movement. Simultaneously, a uniform distribution of the liquid on the entire plate surface will result from this rotational flow, while the centrifugal forces in the liquid, due to its rotational flow, will aid the flow of the liquid from the center of the plate to its periphery. This phenomenon will be particularly advantageous if the column diameters are of a relatively great magnitude. The rotational movement will also afford the attendant advantage of an intensive separating effect upon the liquid droplets entrained by the gas or vapor flow, whereby the admission into such a column can be considerably increased relative to conventional column assemblies of the same diameter and plate spacing. Since the gases or vapors introduced into the lower part of the column must be brought repeatedly into contact, as intimate as possible, with the liquid fed to the uppermost plate, the repetition of the process requires that the liquid be returned from the periphery of each plate to the center of the next plate. For this purpose, it was obvious to use also the kinetic energy of the gases or vapors ascending in the column, arranging the gas-discharge apertures on circular or polygonal paths concentrically placed around the center axis of the relative plate. The apertures, however, in this case must be aligned in a uniform direction of flow radially to such paths toward the center of the plate.

Although the latter measure seems suitable for leading the liquid back to the center of a following plate so that a renewed intensive contact takes place with the gases or vapors ascending in the column, the practical application of this idea has shown that the desired effect can be fully achieved only in the case of a limited liquid admission to each plate. Upon increasing the liquid supply above such limit, a precipitation of the liquid will take place in the maginal area of the plate, which will impair to some extent the return of the liquid to the center of the next plate, thus affecting the exchange achieved by the latter. Accordingly, a portion of the liquid will no longer perform on all of the plates successive to the uppermost plate the necessary movement from the periphery to the center and vice versa, and instead will flow vertically through the marginal area of the column without taking part in the exchange process.

A further drawback resulting from using the kinetic energy of the gases or vapors to lead the liquid back to the plate center, is the loss of the separating effect upon contact of the rotating media, because, due to the centrifugal forces involved, a rotational movement would prevent the necessary return of the liquid to the center of the plate.

Thus, the object of this invention is to provide a contact column in which the above mentioned drawbacks are avoided.

According to the invention, the marginal area of the plate, into the center of which the liquid is fed and on which the liquid will be placed into rotation by the kinetic energy of the gases or vapors flowing from suitably aligned apertures, is designed so that the flow energy transferred to the liquid will be converted into pressure energy (similar to centrifugal pumps), thus permitting the return of relatively large liquid masses from the periphery of one plate to the center of the next plate by means of closed conduits disposed radially beneath the plate, without unduly narrowing the free flowing cross-section for gases or vapors between the conduits or the need to unnecessarily increase the spacing between the plates.

The invention will be more fully explained below with the aid of specific embodiments, reference being had to the appended drawing, wherein:

FIGS. 2 and 3 are cross-sectional views of the column along lines II—II and III—III, respectively, in FIG. 1;

FIG. 4 is a partial axial cross-section of a second column wherein a multiple rotation of the liquid on each exchange plate is effected;

FIG. 5 is a cross-section along line V—V in FIG. 4;

FIG. 7 is a sectional view along line VII—VII of FIGURE 6;

FIGS. 8 to 12 illustrate various constructional details of the apparatus as illustrated in FIGURES 6 and 7;

FIG. 13 shows a column apparatus in axial cross-section along line XIII—XIII in FIGURE 14, similar to that represented in FIGURES 4 and 5, during the process of assemblage;

FIG. 14 is a cross-section along line XIV—XIV in FIGURE 13, and;

Figure 1:
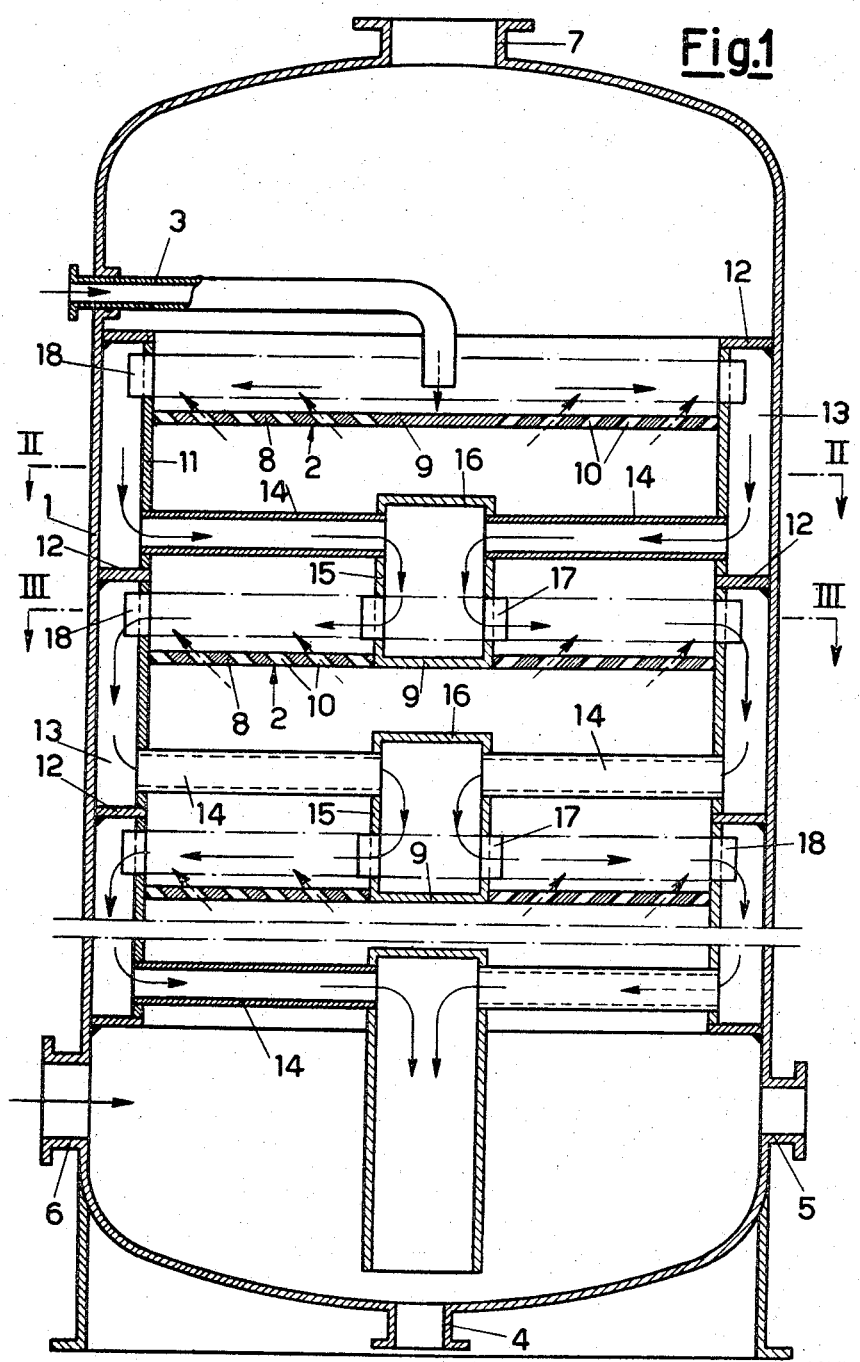
FIG. 1 is a schematic representation of a column apparatus in axial cross-section with several superposed exchange plates.

Referring to FIGURES 1 to 3, the column apparatus is shown consisting of a cylindrical casing or jacket 1 within which a certain number of circular exchange plates 2 are horizontally disposed with equal spacing therebetween. The column jacket 1 is provided with respective connecting openings for the entrance and exit of the gases or vapors and liquid to be brought into contact within the column. The liquid is introduced at the top through an L shaped pipe 3 and discharged vertically onto the center of the uppermost exchange plate 2. The drainage of the liquid may take place alternatively through vertical discharge nozzle 4 located at the bottom of the column, or through horizontal discharge nozzle 5, located toward the bottom of the column in jacket 1. The gases or vapors are fed in at the bottom through horizontal inlet 6 and leave the colmn at the top through vertical outlet 7.

Each exchange plate possesses an exchange surface 8 and impervious surface 9 at the center. The exchange surface can, as shown in FIGURE 3, be composed in a known manner of six sectors 8a, 8b, etc., each of which is provided with a plurality of gas outlet-apertures 10 opening approximately horizontally into the plane of the plate. Apertures 10 are disposed concentrically around the center axis of the column on polygonal paths, and aligned in a uniform direction tangentially to such paths. The exchange surface 8 of each plate borders on an inner casing or vertical sheet cylinder 11, disposed concentrically within column jacket 1. Each cylinder 11 is supported at its lower extremity on a horizontal ring 12, fixed to column jacket 1 above the next lower plate. The inner diameters of the rings 12 are equal to the diameters of the exchange surfaces 8.

The column jacket 1, the sheet cylinders 11 and the rings 12 form annular canals 13 which surround the plates. Horizontal reconduction conduits 14, disposed radially around the vertical axis of the column, extend from the bototoms of canals 13 to a vertical liquid-feed cylinder 15 disposed above the impervious center-area 9 of each plate 2. Cylinders 15 are closed at their top by a circular plate 16 while their vertical exterior surfaces are provided with an outlet means formed by curved guide vanes 17 below the entrance of the reconduction conduits 14. The alignment of vanes 17 coincides with that of the outlet apertures 10 in the exchange surfaces 8. The sheet cylinders 11 open into the space between the outer termination of the exchange surfaces 8 and the inner termination of the horizontal rings 12 through an inlet mean formed by a ring of curved vanes 18. As in the case of guide vanes 17, the vanes curve from an interior tangential direction, outwardly to an exterior radial direction.

The above described arrangement operates as follows:

The liquid, fed in by means of pipe 3 to the impervious area 9 of the uppermost plate 2, is set into violent rotation by gases or vapors which penetrate the exchange surface 8 through orifices 10. Due to the developing centrifugal forces, the liquid quickly reaches the periphery of the plate which is surrounded by the ring of vanes 18. Since the alignment of guide vanes 18 coincides on the inner side thereof with the rotational flow of the liquid, the liquid will first maintain its flow direction on its outward path, and will be slowed down only after it has left the edge of the plate, and is deviated by vanes 18 into a purely radial direction. The kinetic energy imparted to the liquid by the gases or vapors on its path over the plate surface, will thus exert a pressure, whereby the liquid in the annular canal 13 possesses an over-pressure, the magnitude of which will depend upon the violence of the rotation of the liquid on the plate surface. Such over-pressure facilitates considerably the reconduction of the liquid to the plate center through conduits 14, and the velocity of the liquid flow in the reconduction conduits can be made considerably higher than previously possible under normal circumstances wherein the flow from one plate to the next was dependent solely upon the specific gravity of the liquid.

Beside the fact that a restriction in the number and dimensions of the reconduction conduits 14 results in a decrease of the production costs while only slightly reducing the free flow area for the gases or vapors between the conduits, the higher velocity of liquid flow affords the additional advantage of lessening the chances of a deposit of solid substances in these very reconduction conduits.

As noted above, the liquid fed onto the uppermost plate is conducted back to the liquid feed cylinder 15 disposed centrally above the impervious area 9 of the next plate. This process is effected without any risk of premature precipitation due to the operation described. From cylinder 15 the liquid flows outwardly over guide vanes 17, disposed at the bottom extremity thereof, onto the exchange surface 8 of the next plate in the same direction as the gases or vapors which penetrate the exchange surface of the latter, thus acting anew upon the liquid to cause rotation about the vertical axis of the column.

In the embodiment of FIGURES 1–3, a rotary movement of the media takes place about the center or vertical axis of the column on all of the superposed plates 2, which effects contact between the gases or vapors ascending and the liquid conducted downwardly within the column. The advantage inherent in the rotation of an intensive centrifugal-force separating effect can thus be appreciated in its full scope. It may further be desirable to change the direction of rotation from one plate to another, which measure, in a construction of plates of individual sectors with outlet apertures 10 for the gases or vapors disposed parallel to each other, affords, from a technical point of view, the advantage of considerably less waste if, as is customary, the individual sectors are cut from sheet-metal plates already subjected to a preliminary shaping such as, for example, expanded metal.

If the flowing energy exerted upon the liquid by suitably directed gases or vapors is utilized to increase the weight rate of flow of the gases or vapors and, particularly, the liquid then the same effect may be used for a requirement which is opposed to the above, namely, bringing very large masses of gases or vapors into intimate contact with extremely small amounts of liquid. With column assemblies of the prior art, solving this problem has been found quite difficult, due to the fact that the slight amount of liquid is almost always vaporized by the large volumes of gases or vapors, which then noticeably decreases the exchange effect of the plates. This drawback can be effectively avoided if the pressure exerted upon the liquid, instead of leading the liquid from one plate to the next, is used to reconduct the liquid into the median area of the same plate, while drainage to the next plate occurs in a known manner through a discharge pipe located centrally within the median area of the plate. The arrangement and the mode of operation of such a construction is shown in FIGURES 4 and 5.

In this case there are also several exchange plates 102 superposed within a column 101. The plates include an exchange surface 108 with gas-flow orifices 110. The plates are surrounded by sheet cylinders 111, to which a ring of vanes 118 are joined at the top. Cylinders 111 are attached to respective horizontal rings 112 above vanes 118. In this embodiment, however, there are two separate ring-surfaces 112 and 112a, the latter connecting the bottoms of cylinders 111 to jacket 101 to form separated annular canals 113 between the column jacket 101 and the sheet cylinders 111. The reconduction conduits 114, disposed horizontally and radially, lead to the feed cylinders 115, situated in the column center, and closed at their bottoms by horizontal plates 119 immediately below the inlet of the conduits 114. The upper edges of cylinders 115 border on the circular inner edges of the plates 102, the ends being flush therewith.

A vertical discharge pipe 120 is disposed concentrically within cylinder 115. The upper ends of the pipes can according to needs, be flush with the associated plate surfaces or be slightly raised, while their lower extremities are enclosed by respective liquid seals formed as cylinders 121 surrounding the discharge pipes 120. A horizontal plate 122 is disposed within each cylinder 121 just below the bottom of pipe 120. Cylinder 121 is extended beyond plate 122 in order to prevent liquid from accumulating beneath the plate. It is necessary to employ a liquid seal in the liquid discharge from one plate to the next to seal the outlet at the gas or vapor side, while providing an inlet to the next lower plate.

The liquid, due to its slight amount, need not be fed to the median area of the uppermost plate 102, and instead is fed into the annular canal 113 surrounding the uppermost plate by means of a feed nozzle 123. After filling up the flow spaces located underneath the plate surface, the liquid flows from the feed cylinder 115 over the exchange surface 108 where it is set into rotation by the gases or vapors emitted through the directed apertures 110. The flow continues, as described above, with the liquid flowing back into the canal 113, passing over the guide vanes 118 to the radially disposed recondition conduits 114 and back to the liquid feed cylinder 115. The process described above will continually be repeated. Only the liquid excess will flow over the upper edge of the discharge pipe 120 and into the cylinder 121, passing therefrom into the feed cylinder 115 of the following plate 102 on which the same process will repeat itself in the manner set forth above.

The conversion of the flow energy into pressure power within the liquid is thus used for a multiple rotation of the liquid on the same plate and for producing a continuous liquid layer over the plate surface. The magnitude of the liquid rotation can be increased, at least within certain limits, by a proper elevation of the overflow edge of the discharge pipe 120.

In summary, it is possible to bring about the conversion of flow energy into pressure within the liquid by means of an exchange plate on which the liquid fed into the median area is set into rotation by the gases or vapors, admitted in a suitable manner to the plate surface. The pressure can be used alternatively either to intensify the liquid movement from one plate to the following one, or for the rotation of the liquid on each individual plate. A further analogy to the principle as applied to centrifugal pumps, consists in the fact that the conversion of the flow energy into pressure will also take place, though not in its ful scope, if the use of special guide vanes to deviate the liquid from rotational flow into a radial flow, is dispensed with due to the risk, for instance, of deposits or the like. However, it is more important to cover the annular canal surrounding the plate by means of a horizontal ring placed at a relatively small distance above the respective plate, whereby the liquid, which is already subjected to radial flow toward the plate periphery due to centrifugal forces, will be directed vertically in a downward direction.

As shown, for example, in FIGURE 1 the horizontal cover ring may be used not only for the purpose of deviating the liquid in a vertical direction but also for the purpose of sealing the annular canal surrounding the next higher plate at its bottom.

The representations of the embodiments of FIGURES 1 to 3 and FIGURES 4 and 5 are of a basic nature, allowing for the technical construction of the invention with certain modifications, particularly regarding the insertion and removal of the plates in the case of column diameters of a greater magnitude. For instance, with columns of larger diameters, the plates may be constructed of individual sectors, which are provided with outlet apertures for gases or vapors, disposed parellel to each other.

If columns having very large diameters are involved, then the number of sectors should be chosen so that the length of the chord of each sector of circle is small enough so as to enable one to make it pass through the so-called man-holes provided in the jacket of the column. This may make necessary, possibly, an exceedingly high number of sectors, which may be an inconvenient construction owing to the inserted members needed for sustaining and supporting the individual plate portions.

Figure 15:
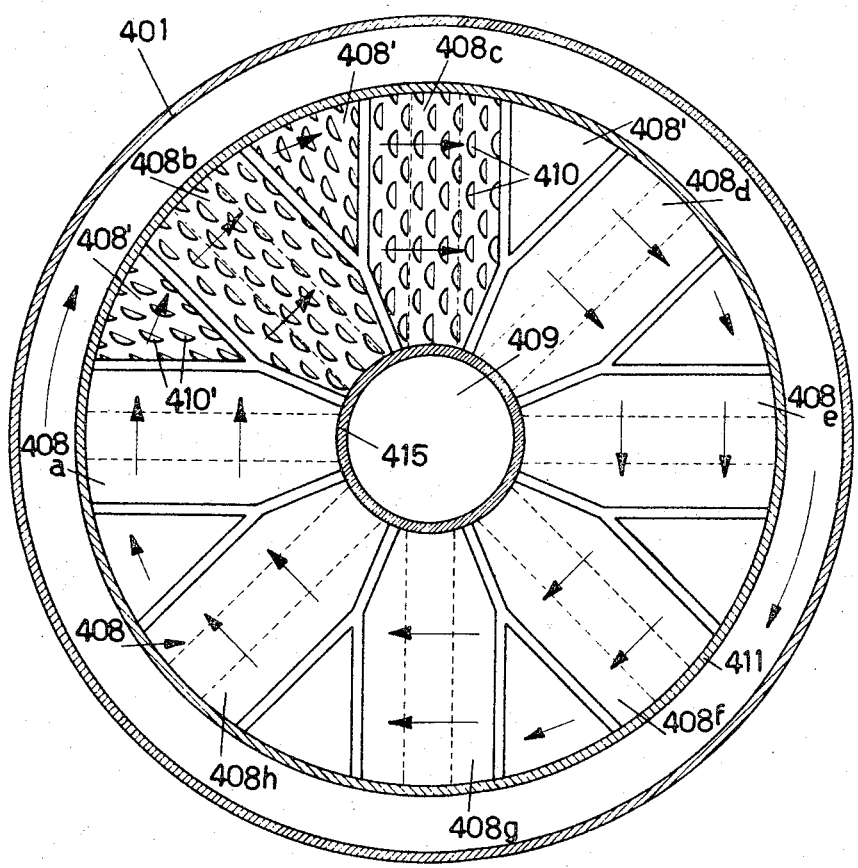
FIG. 15 shows an exchange plate composed of individual sectors which is particularly suitable in the case of column diameters of great magnitude.

A particularly suitable division of the plate surface in such cases of columns having large diameters is the one that is diagrammatically represented in FIG. 15 for a plate that can be inserted for instance into a column according to FIG. 1. The representation of FIG. 15 is a horizontal section taken through the column just above the plate surface. By 401 is indicated the jacket of the column within which the metal sheet cylinder 411 is inserted. The plate consists of the exchange surface 408 and of the impermeable surface 409 at the center of the plate. As illustrated, the exchange surface 408 is divided into a number—eight in the instant case—of sectors 408a, 408b . . . 408h, which pass through from the border zone to the impermeable middle zone, each being essentially in the shape of a rectangle with an essentially triangular portion contiguous to one side thereof. The shorter side of the respective rectangles 408a–408h which forms one part of the external periphery of the plate, is so long that it can easily be made to pass just through a man-hole (not shown) in the jacket of the column. Each of the sectors 408a–408h is provided with series of outlet openings 410 for the gases or vapours, the series running parallel to the longitudinal side of the rectangle.

The sectors 408a–408h the plate surface do not entirely complete the plate, since in the zone of the plate periphery there are triangular areas which are filled with additional triangle-elements 408'. These elements 408' are provided with outlet openings 410' in parallel series. As can be seen, the elements 408' do not reach as far as the middle of the plate and, at the maximum their sides can possess at the plate periphery a length equal to the sides of the rectangle parts of the sectors 408a, etc., at the plate periphery, so that they can be made to pass through the man-holes as do the latter.

It should be understood that a similar division can be made also with plates that can be mounted in columns according to FIG. 4, if this appears suitable because of the diameter of the column.

With even larger column diameters it is possible to carry farther the above principle of plate division by providing in lieu of the triangular elements 408' further sector elements, analogous to those 408a, etc., the triangular part of which replaces the elements 408' and the rectangular part of which lies radially with respect to the plate periphery.

With respect to the embodiment of FIGURES 1 to 3 the reconduction conduits, and in some cases the outer and inner sheet cylinders, may be made of individual parts, which, upon mounting, can be introduced separately into the column wherein they can be mutually connected in such a manner as to render subsequent removal possible at any time.

A practical embodiment of such an arrangement is shown in FIGURES 6 to 12. According to this embodiment, an anchor tube 230 is disposed within the axis of column jacket 201 and provided with spaced supporting flanges 231 welded thereto. On the inner surface of the column jacket 201 rings 232 are welded at equal distances in various horizontal planes. Rings 232 possess a forked profile, and the stems of T shaped annular segments 233 are inserted into the forks of respective rings 232. The outer sheet cylinders 11, shown in FIGURE 1, together with the vanes 18, are assembled of cylindrical segments 234, one of which is shown in a front view in FIGURE 9. Cylindrical segment 234 includes near its lower end, rectangular recesses 235 and 236 in opposing edges. When assembled, the recess 235 of a segment forms with the recess 236 of the adjacent segment, a seat for a liquid recondition conduit 237 of rectangular cross section. The top of each sheet cylinder segment 234 includes guide vanes 238 which are punched from the sheet and bent in the desired alignment, as shown in FIGURE 7, At the inner surface of each sheet cylinder segment 234, a bearing collar 239 is welded just below the guide vanes 238.

The cylinder segments 234 are erected with their lower edges resting upon the stem of a T shaped collar piece 233 (see FIGURE 6), which had previously been inserted into a corresponding fork of a ring 232. The upper part of the segments rest against the lower leg of the forked profile of the next ring 232, whereupon the next T-piece 233 can also be inserted therein. Because of the two T-pieces, the cylinder segment 234 will be rigidly secured at both the upper and lower area and supported by the lower T-piece.

Each exchange plate 202 comprises six segments, each of which is provided with a reenforcing frame consisting of three struts 240, 241 and 242 disposed along the sides of a triangle and connected with each other. The frame carries a sheet-metal plate 208 of expanded metal and a non-punched sheet-metal plate 209. Along one side of each segment, a sheet-metal strip 243 is welded covering the space between two adjacent segments, as clearly shown in FIGURE 8. After the insertion of the plate segments, the outer edge of the sheet-metal plate 208 is mounted on the support rings 239 of the corresponding cylindrical segments 234 (see FIGURE 6), while the inner ends of the struts 240 and 241 are laid on the support flanges 231 of anchor pipe 230.

On the lateral covering strip 243 of each plate segment there are two fixing blocks 244 and 245 secured in a spaced relationship. Similar blocks 246 and 247 are attached to the lower portion of struts 240 and 241. These blocks secure sheet-cylinder sectors 248, which form sheet cylinder 15 of FIGURE 1. The sheet cylinder sectors 248, one of which is shown in a front elevational view in FIGURE 10, are bent in opposite directions at each of their lateral edges, so that they can be inserted between the fixing blocks at the top and bottom, as clearly illustrated in FIGURES 6 and 7.

Each of the sheet cylinder sectors 248 includes, near the lower edge, guide vanes 249 which are directly punched from the sheet metal and bent outwardly. Furthermore, each cylinder sector 248 is provided with rectangular recesses 250 and 251, which recesses correspond to that of the sheet cylinder sectors 234, and serve as a seating for an end of the liquid reconduction pipes 237.

Figure 6:
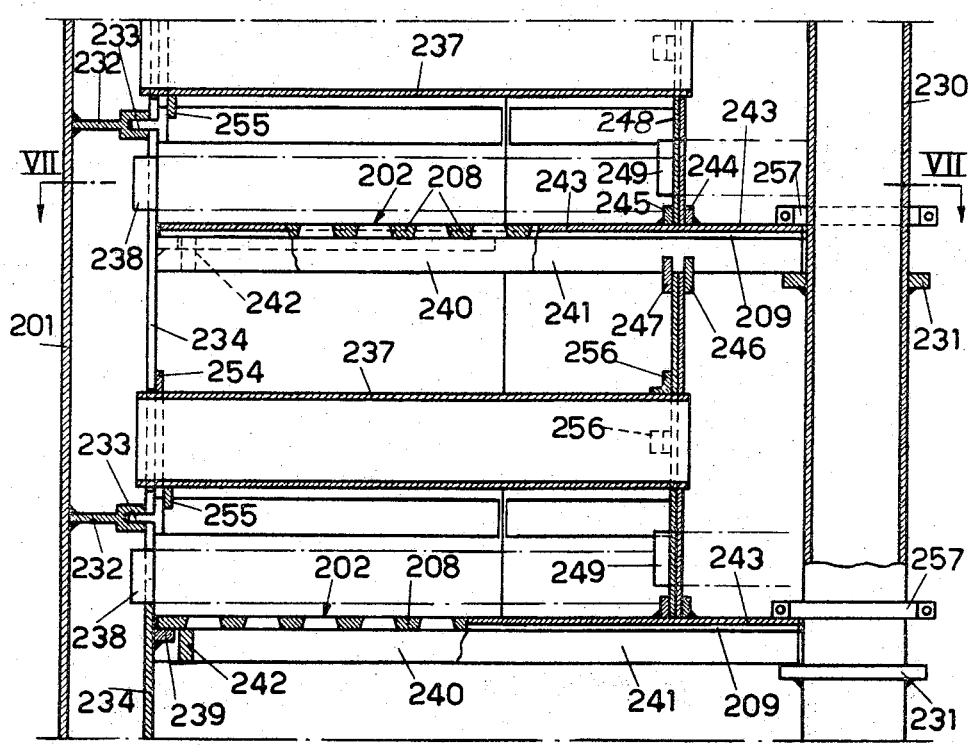
FIG. 6 represents a partial axial cross-section of an embodiment similar to that illustrated in FIGURES 1–3, along line VI—VI of FIGURE 7.

A reconduction pipe 237 is represented in FIGURE 11 in a lateral view, while in FIGURE 12 it is shown in a top elevational view. Close to the end of pipe 237 which is seated in the recesses 235 and 236 of cylindrical sectors 234, straight flange strips 252 and 253 are laterally fixed, while at the top and bottom curved flange strips 254 and 255 are fastened. The pipe rests on the flanges against the inner side of the sheet cylinder sectors 234, and secures in position the T-profile sectors 233, as shown in FIGURE 6. In the proximity of the other pipe extremity which is seated in the recesses 250 and 251 of the sheet cylinder sectors 248, brackets 256 are fixed to the pipe at both lateral walls and at the upper wall. The brackets rest against the outer surface of the sheet cylinder sectors 248, whereby in the assembled condition all of the machine parts are safely secured in position. In order to avoid lifting the plates at their center, they are also held down against the supporting flanges by means of clamp straps 257, which are applied around the anchor tube 230.

The practical construction of the embodiments of FIGS. 4 and 5 can be effected in the manner represented in FIGURES 13 and 14. In this case it is possible to design, as a compact construction, each sector 308 of a plate together with the ancillary segment 334 of the outer sheet cylinder, the corresponding segment 348 of the inner sheet cylinder (the segments being herein constructed as flat sheet metals), and a reconduciton conduit 337, disposed through the center axis of the sector. This construction unit furthermore includes a vane segment 338 in the extension of segment 334, and joined at one portion to the horizontal ring segment 312, the outer limit of which lies, when assembled, against the sector construction-unit at the inner side of the column jacket 301. The outer sheet-metal segment 334 lies with its lower edge against a ring-shaped carrying bracket 312a, attached to the inside of the column jacket 301. Bracket 312a has an edge 312b bent upwardly in such a manner as to permit insertion of a gasket 335 between the bracket and the base portion of sheet-metal segment 334. The unit includes a liquid tank consisting of a trapezoidal horizontal bottom plate 319, a flat vertical plate 320, and lateral walls formed by metal sheets 340 and 341. These sheets are directed as bracing means below the two side edges of the plate sector 308 and extend radially outwardly to border on the sheet-metal segment 334.

A tubular reconduction conduit connects the outer sheet-metal segment 334 with the medium sheet segment 348 of the construction unit, and opens into the above described liquid tank as a part of the unit. The inner sheet-metal segment 320 is extended beneath the bottom plate 319 and includes thereon guide vanes 349. The upper edge of segments 320 may be flush with or slightly higher than the plane surface of the bottom sector 308, depending upon requirements. The lower edge of segment 320, after it has been inserted in the column, rests against the bottom plate 322 of a trough, forming, with a sheet cylinder 321, a water seal which is fixed to a rod 330 disposed centrally in the column axis.

The inner sheet segments 320 of all of the bottom-sector construction units thus form an octagonal center discharge pipe, analogous to pipe 120 as shown in FIGURES 4 and 5. The inner surface of the outer annular canal which surrounds each assembled plate, is likewise an octagonal construction. Although preferred embodiments of the invention have been shown and described, the invention is not so limited, and should be defined by the following claims.

I claim:
1. A contact column for bringing a liquid descending in the column into intimate contact with ascending gases or vapors, comprising an outer substantially vertical casing, a plurality of substantially horizontal exchange plates arranged one above the other respectively at different elevations in said outer casing and respectively having outer peripheries spaced inwardly from said outer casing, each plate having a central impervious portion and each of said plates being formed with apertures distributed between said central impervious portion and said outer periphery thereof and said apertures being inclined upwardly and outwardly as well as circumferentially for imparting a tangential flow to said ascending gases or vapors and for imparting a rotational flow to liquid on said plates with respect to the column axis, an inner casing coaxial with and spaced inwardly from said outer casing and connected to said plates at said outer peripheries thereof and extending vertically above and below the periphery of each plate, said inner casing defining with said outer casing an annular canal surrounding each of said plates, a horizontal ring covering each annular canal adjacent and above each plate so that each pair of successive horizontal rings defines the upper and lower limits of each annular canal with the latter extending above and below each plate, said inner casing being formed in the immediate vicinity of and just above each plate with an inlet means for admitting the rotating liquid to each of said canals, and a plurality of radially disposed reconduction conduits communicating with said canals for feeding liquid under pressure from a canal communicating with and receiving liquid through said inlet means situated just above one plate to the center of the next lower plate, further including liquid feed cylinders centrally disposed with respect to said plates, said reconduction conduits extending from said annular canals into said liquid feed cylinders, said liquid feed cylinders are located above respective impervious portions of said plates, said reconduction conduits being located beneath said plates and adapted to feed liquid to the feed cylinder of the next lower plate, and said feed cylinders being respectively formed just above said plates with outlet means for directing liquid outwardly from said feed cylinders respectively toward the outer peripheries of said plates.

2. A contact column according to claim 1, wherein said inlet means comprises rings of guide vanes formed in said inner casing just above the peripheries of said plates, respectively.

3. A contact column according to claim 2, wherein said guide vanes are curved to change the generally tangential flow of said liquid into a generally radial flow.

4. A contact column according to claim 3, said outlet means including guide vanes in the lower portions of said liquid feed cylinders for introducing the liquid from said liquid feed cylinders onto respective plates, said impervious central portions of said plates respectively closing the bottom ends of said cylinders and being situated respectively in the same planes as the remainder of said plates.

5. A contact column according to claim 4, wherein said last named guide vanes are curved from an inner tangential direction to an outwardly extending radial direction.

References Cited

FOREIGN PATENTS

| | | |
|---|---|---|
| 580,553 | 8/1959 | Canada. |
| 853,296 | 11/1960 | Great Britain. |
| 610,657 | 10/1960 | Italy. |

HARRY B. THORNTON, *Primary Examiner.*

RONALD R. WEAVER, *Examiner.*

E. H. RENNER, *Assistant Examiner.*